United States Patent [19]
Eckert

[11] Patent Number: 5,718,742
[45] Date of Patent: Feb. 17, 1998

[54] LADLE AND IMPELLER ROTATION FOR FLUXING MOLTEN METAL

[76] Inventor: C. Edward Eckert, 260 Lynn Ann Dr., New Kensington, Pa. 15068

[21] Appl. No.: 682,130

[22] Filed: Jul. 17, 1996

Related U.S. Application Data

[63] Continuation-in-part of Ser. No. 548,087, Oct. 25, 1995, Pat. No. 5,630,863, which is a continuation-in-part of Ser. No. 317,539, Oct. 4, 1994, Pat. No. 5,462,581, which is a continuation-in-part of Ser. No. 91,608, Jul. 13, 1993, Pat. No. 5,364,450.

[51] Int. Cl.$^6$ .................... C22B 9/02; C22B 21/06
[52] U.S. Cl. .................... 75/678; 75/680; 75/681; 75/708
[58] Field of Search .................... 75/678, 680, 681, 75/708; 266/204, 213, 235

[56] References Cited

U.S. PATENT DOCUMENTS

| | | | |
|---|---|---|---|
| 3,377,059 | 4/1968 | Ankersen | 266/204 |
| 3,774,670 | 11/1973 | Gyöngyos | 164/279 |
| 3,799,410 | 3/1974 | Blossey et al. | 222/566 |
| 3,925,575 | 12/1975 | Church et al. | 427/226 |
| 3,982,913 | 9/1976 | Feichtinger | 55/55 |
| 4,153,101 | 5/1979 | Chateau et al. | 164/428 |
| 4,303,181 | 12/1981 | Lewis et al. | 222/591 |
| 4,339,508 | 7/1982 | Tsuya et al. | 428/606 |
| 4,485,835 | 12/1984 | Huber et al. | 164/430 |
| 4,526,223 | 7/1985 | Ai et al. | 164/428 |
| 4,527,612 | 7/1985 | Yu et al. | 164/428 |
| 4,550,766 | 11/1985 | Ai et al. | 164/428 |
| 4,550,767 | 11/1985 | Yu et al. | 164/428 |
| 4,668,262 | 5/1987 | Kithany | 65/1 |
| 4,784,374 | 11/1988 | Pelton | 266/215 |
| 4,798,315 | 1/1989 | Lauener | 222/591 |
| 5,145,514 | 9/1992 | Gariepy et al. | 75/681 |
| 5,160,693 | 11/1992 | Eckert et al. | 266/235 |
| 5,164,097 | 11/1992 | Wang et al. | 222/590 |
| 5,364,450 | 11/1994 | Eckert | 75/678 |
| 5,462,580 | 10/1995 | Eckert | 75/678 |
| 5,462,581 | 10/1995 | Eckert | 75/678 |
| 5,474,282 | 12/1995 | Eckert | 266/280 |

FOREIGN PATENT DOCUMENTS

| | | | |
|---|---|---|---|
| 1233546 | 2/1967 | Germany . | |
| 247141 | 6/1969 | U.S.S.R. . | |
| 954512 | 4/1964 | United Kingdom | 75/708 |

*Primary Examiner*—Melvyn Andrews
*Attorney, Agent, or Firm*—Andrew Alexander

[57] ABSTRACT

An improved method for processing a body of molten metal using an impeller and a rotatable container, the method including increasing shear forces in the body of molten aluminum and reducing vortex formation, the method comprising the steps of providing a body of molten metal in a container and projecting an impeller on a shaft into the body. The impeller is rotated in one direction and the container and the body of molten metal is rotated counter or in a direction opposite of rotating the impeller, the container and the impeller being rotated at a rate which minimizes vortex formation and which maximizes shear forces in the body for purposes of improved processing.

15 Claims, 6 Drawing Sheets

LADLE AND IMPELLER ROTATION FOR FLUXING MOLTEN METAL

CROSS REFERENCE TO RELATED APPLICATIONS

This application is a continuation-in-part of U.S. Ser. No. 08/548,087, filed Oct. 25, 1995, now U.S. Pat. No. 5,630,863 which is a continuation-in-part of U.S. Ser. No. 08/317,539, filed Oct. 4, 1994, now U.S. Pat. No. 5,462,581, issued Oct. 31, 1995, which is a continuation-in-part of U.S. Ser. No. 08/091,608, filed Jul. 13, 1993, now U.S. Pat. No. 5,364,450, issued Nov. 15, 1994.

BACKGROUND OF THE INVENTION

This invention relates to molten metal such as molten aluminum, and more particularly, it relates to an improved method for dispersing treatment media such a fluxing gas or salts in molten metal.

The use of a chlorine containing reactive fluxing gas, for the purpose of removing alkali elements (i.e., Na, Ca, K, Li), is a well established practice in the treatment of molten aluminum. Under equilibrium conditions, the respective chlorides of these elements are produced as reaction products. With the exception of LiCl, all of these halide salts, as pure species, are solid at normal treatment temperatures and thus are easily separated to the melt surface as a supernate and are removed by skimming.

Alkali elements are usually present at melt concentrations less than 500 ppm. According to the law of mass action (reaction rate approximately proportional to the concentration of reacting species), non-equilibrium metastable salts such as $AlCl_3$ and $MgCl_2$ (if Mg is present) are generated. These halides are undesirable because they contribute significantly to process airborne emissions. Further, $MgCl_2$ melts at 1306° F. and is typically molten at normal melt treatment temperatures. Molten salts are highly undesirable because of the difficulty of removing to the surface for skimming. Thus, it is highly desirable to react or complex the alkali elements to produce higher melting salts which in solid form are more efficiently separated by flotation to the surface.

In the prior methods of dispersing fluxing gas, for example, in a molten aluminum body, the fluxing gas is introduced down a shaft into the body and dispersed by a rotating impeller mounted on the shaft. However, this method is not without limitations. The rotating impeller creates a vortex about the shaft that indicates that a large portion of the molten metal is swirling or circulating about the impeller shaft at a rate approaching the rotation speed of the impeller. Fluxing media added to the molten metal tends to circulate with the molten metal with only minimal dispersion. Further, the vortex has the effect of increasing the surface area of the molten body exposed to air. The increased exposure of the molten metal to air results in an increase in dross formation, subsequent entrainment of the dross and its detrimental collateral effects. When the fluxing material is a gas, the vortex creates a problem in yet another way. Fluxing gas is displaced towards the center of the vortex by body force separation with the result that other parts of the molten body are not adequately treated with fluxing gas. Thus, the effectiveness of the process is reduced because portions of the molten body do not get treated with fluxing material. In addition, fluxing gas entrained in the molten metal flow pattern tends to coalesce, resulting in larger bubbles of fluxing gas developing in the melt. The larger bubbles lower the effectiveness of the fluxing process because less molten metal gets treated.

Common methods employed to suppress vortex formation include the insertion of baffles or rods into the melt. However, baffles are undesirable because a dead volume develops behind the trailing edges of the baffle. Another method used to suppress vortex formation is to limit power input to the impeller. However, this severely limits efficiency.

These problems continue to plague the industry as indicated in U.S. Pat. No. 5,160,693, for example, which discloses that with rotating impellers a surface vortex forms, the vortex rotating about and flowing downwardly along the impeller shaft, thereby agitating surface dross and drawing impurities back into the melt. The patent also indicates that an ideal system would minimize disturbances to the surface dross to prevent recontamination of the treated melt.

Thus, there is a great need for a more effective fluxing process which suppresses ingestion of dross from the surface back into the melt by vortex formation, for example, maintains the fluxing material freely dispersed throughout the molten body, and intensifies the contact of molten metal with fluxing material for improved fluxing of the melt.

SUMMARY OF THE INVENTION

An object of this invention is to provide an improved treatment process for dispersing media in molten metal.

Another object of this invention is to provide an improved fluxing process for molten aluminum.

Yet a further object of the invention is to provide an improved fluxing process for molten aluminum using a rotating impeller wherein substantially no vortex is formed.

And yet a further object of the invention is to provide an improved process for a body of molten aluminum wherein the fluxing gas is freely dispersed throughout the body for improved contact of fluxing gas with metal.

Still, yet another object of the invention is to provide a process for providing increased shear forces in a body of molten metal for improved dispersion of treatment media, such as fluxing gases and salts, throughout the body.

And still a further object of this invention is to provide a process for fluxing molten aluminum wherein large amounts of fluxing gas can be added without entrainment or fuming above the melt.

These and other objects will become apparent from a reading of the specification and claims and an inspection of the accompanying drawings appended hereto.

An improved method for treating a body of molten aluminum using an impeller suitable for dispersing fluxing gas or solid particles in the body of molten aluminum is disclosed. The method produces increased shear forces in the body of molten aluminum and reduces vortex formation. The method comprises the steps of providing a body of molten metal in a container and projecting an impeller on a shaft into the body. The impeller is rotated in one direction and the container and said body of molten metal is rotated in a direction opposite or counter of rotating the impeller. The container and the impeller are rotated at rates which minimize vortex formation and which maximize shear forces in said body for purposes of improved processing.

DETAILED DESCRIPTION OF THE PREFERRED EMBODIMENTS

Figure 1:
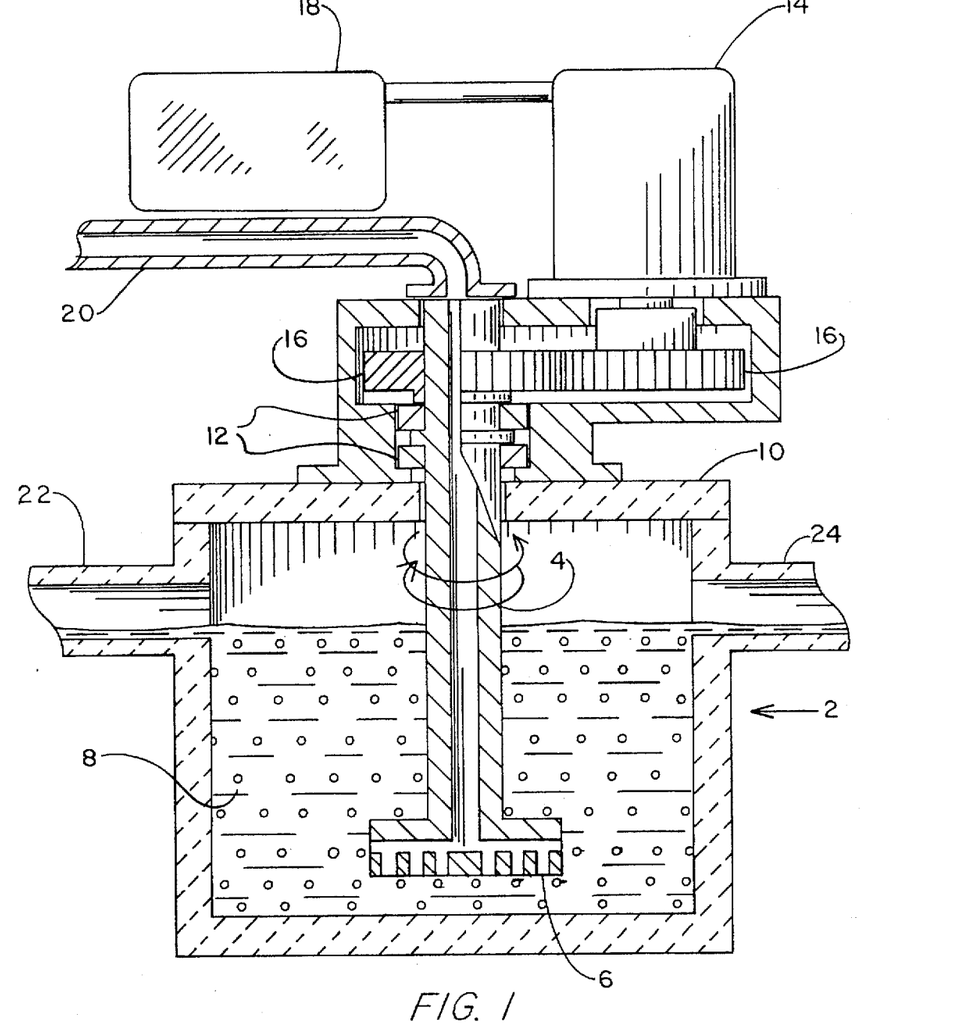
FIG. 1 is an elevational view in cross section illustrating the lack of vortex formation, molten metal flow characteristics and fluxing gas dispersion in the present invention utilizing a single impeller.

Referring more specifically to FIG. 1, there is shown a schematic of a gas fluxing bay 2 having a hollow shaft 4 and impeller or disperser 6 located in body of molten metal, e.g., aluminum, 8. Shaft 4 is carded by structure 10 and rotates on bearing 12. Further, shaft 4 is rotated by motor 14 through gears 16. Direction of rotation and revolution speed of motor 14 is controlled by control panel 18 and in accordance with the invention direction of rotation is periodically reverse for purposes of increasing shear forces minimizing vorticity as explained herein. Fluxing gas is added through tube 20 and down hollow shaft 4 before being dispersed through tubes or conduits in impeller 6 into molten aluminum 8. Instead of passing fluxing gas down hollow shaft 4, the fluxing gas may be added to the molten metal through a tube or other means. The fluxing gas may be injected adjacent impeller or disperser 6 for dispersing throughout the melt. Fluxing gases that can be used for molten aluminum in the present invention include nitrogen containing gases, carbon containing gases, e.g., fluorocarbons, halogen gases and the so-called inert gases; namely, helium, neon, argon, krypton, xenon, along with nitrogen, carbon dioxide and mixtures of these gases. In addition, chlorinaceous gases such as chlorine may be used individually or combined with the above gases. Combinations of fluxing gases that are useful in the present invention for fluxing aluminum base alloys include, for example, a combination of reactive gases such as chlorine and sulfur hexafluoride. A carrier gas such as carbon dioxide, nitrogen or an inert gas may be included with the reactive gases. When the combination of $Cl_2$ and $SF_6$ are used they may be present in the fluxing gas in a ratio that ranges from 2:1 to 10:1 parts $Cl_2$ to $SF_6$. A carrier gas may be present in this combination as long as the $Cl_2$ to $SF_6$ ratio range is maintained. The $Cl_2$ and $SF_6$ combination or other fluorine containing compounds such as fluorocarbons, e.g., hexafluorethane are useful for fluxing in accordance with the invention because the fluorine can form high melting point salts which have the capability of complexing with chloride species thereby increasing the melting point of the resulting salt mixture. Gas fluxing can be performed in batch or on a continuous basis. On a continuous basis, molten metal enters along conduit 22 and leaves by channel 24 after fluxing has taken place.

The fluxing process removes both dissolved and suspended impurities, including oxides, nitrides, carbides, and carbonates of the molten metal and alloying elements. The dissolved impurities include both dissolved gases and dissolved solids. Dissolved gases in molten aluminum, for example, include hydrogen and dissolved solid particles include alkali elements such as sodium and calcium. When chlorine gas is added, for example, it forms the chloride salt of the impurity which rises to the surface and is removed. Suspended solids are transported to the melt surface by attachment to rising gas bubbles. Hydrogen is removed by desorption into the gas bubbles and is removed. Thus, it is important to keep a fine dispersion of fluxing gas or fluxing salt distributed throughout the melt in order to provide many sites for collection and removal of both dissolved and suspended impurities.

For purposes of fluxing in accordance with the present invention, shaft 4 and impeller or disperser 6 are rotated in either clockwise or counter-clockwise direction followed by reversing direction of rotation periodically. This has the effect of substantially eliminating formation of a vortex in the body of molten metal and the problems attendant therewith. Minimizing or eliminating the vortex greatly reduces the ingestion of dross from the surface into the body of melt being treated. More importantly, periodically reversing direction of rotation of impeller 6 has the effect of considerably increasing shear force developed in the molten metal, resulting in a more uniform, fine dispersion of fluxing material throughout fluxing bay. Adding fluxing material and reversing impeller rotation direction periodically increases fluid velocity gradients in the molten metal, particularly in the radial direction. It will be appreciated that adding fluxing gas and reversing direction of rotation of impeller 6 periodically has the effect of increasing the energy of mixing applied to the body of molten metal. However, the large increase in energy of mixing is obtained with substantially no vortex and the attendant problems of dross ingestion. For example, in prior gas fluxing methods, the impeller was rotated uni-directionally and the body of molten metal would be accelerated in the direction of rotation of the impeller resulting in formation of a vortex, and only minimal energy of mixing was applied during dispersing of fluxing gas. Further, metal in the body can be used as a reaction force, opposing the rotation of the impeller, thereby maximizing the energy input. As the body is accelerated in the direction of impeller rotation, the magnitude of the reaction force is proportional to difference in relative velocity between molten metal and impeller. In the present invention, reversing direction of rotation of impeller 6 periodically greatly intensifies the energy of mixing applied during dispersing of fluxing gas. This results in molten metal flow direction being directionless or random in the body of molten aluminum and without formation of a vortex.

By shear forces are meant the forces generated by a stream of molten metal in a body moving in one direction on a stream or portion of molten metal moving in another direction, for example, an opposite direction. For instance, when an impeller is rotated, the melt flows in the same direction as the impeller at a speed less than the speed of rotation of the impeller. However, both speeds are usually not very different. The greater the difference in these two speeds the greater is the capability for dividing fluxing gas into fine bubbles by the shear force. When the direction of rotation of the impeller is reversed, a stream of metal works on or creates a shear force on an adjacent stream or portion of molten metal until the whole body reverses direction.

That is, the body is moving or rotating in one direction and when the impeller is reversed, a small portion of molten metal rotates in an opposite direction, the portion increases until the whole body rotates in a generally opposite direction. It is this period of reversing or changing direction of the molten metal which induces the greatest shear forces on adjacent portion or streams of molten metal to change directions.

By inducing movement of portions of the molten metal in different directions is meant that while first portions or streams of the molten metal are moving in one direction, for example, in a circular direction, other portions or streams are forced to move in another direction, for example, generally counter to the first portions or streams. The inducing of movement may also be performed by mixing means such as impellers, electromagnetic pumps, gas nozzles or tuyeres, and streams of molten metal introduced or applied to a body of the molten metal or a combination these mixing means. Further, moving portions of the molten metal in another direction by changing directions of applying the mixing means, for example, means that the direction of the impeller may be reversed or merely stopped periodically so as to induce shear stresses into the body of molten metal by having streams or portions of the molten metal going in one direction and then having streams or portions going in other directions. Another mixing means may be applied in another direction simultaneously or alternating with the first mixing means. For example, an impeller may be used to induce movement of a portion of the molten metal in one direction and an electromagnetic pump may be used to induce movement of a second portion in another direction to provide shear forces in the body.

By fluid velocity gradient is meant the velocity profile described by the quotient of the change in radial fluid velocity, $dV_\phi$, and change in radial distance, dr. The velocity gradient is therefore, $dV_\phi/dr$, by Newton's law of viscosity, the magnitude of the shear force, $\tau$, is related to the velocity gradient by the flow viscosity, n, as follows:

$$\tau = -\eta^{(dV_\phi/dr)}$$

With respect to the length of time before reversing the direction of rotation, this can extend to 10 minutes or more with a typical time period before reversing being less than 5 minutes with a suitable period being in the range of 0.1 seconds to 3 minutes. Or, the period for reversing can vary. For example, the reversing period may start at 5 minutes and then work down to 1 minute.

The present invention has the advantage that much higher levels of fluxing gas can be introduced to the melt at each fluxing stage. By use of stage as used herein is meant a body of molten metal employing at least a single impeller or disperser operated in accordance with the invention to disperse fluxing gas therein. That is, in the use of prior uni-directional rotating impellers, the amount of fluxing gas that could be added was very limited. Typically, the amount of fluxing gas that could be added using a single uni-directional rotating impeller could not exceed 0.7 SCF/hour. If greater amounts were added fuming would be observed above the melt. Fuming above the melt is indicative of incomplete reaction of the fluxing gas with undesirable constituents in the melt. The material which constitutes the fume is the unreacted gas, for example, chlorine or aluminum chloride. Thus, it will be seen that conventional systems using uni-directional rotating impellers are very inefficient. By contrast, in the present invention, very high, levels of fluxing gas can be added per stage without fuming. That is, in the present invention fluxing gas can be added at a rate in the range of 1 to 650 SCF/hour and typically 1 to 425 SCF/hour or greater without the problem of fuming, depending to some extent on the aluminum alloy and the quality of the melt being fluxed. In certain modes, the fluxing gas can be added at a rate of 5 to 250 and in other modes at a rate of 5 to 50 SCF/hour and typically 10 to 25 SCF/hour, depending to some extent on the fluxing gas and the mount of metal being fluxed. It is believed that utilization of high levels of fluxing gases in the present invention result from operation under near equilibrium conditions and from high shear forces imposed on the melt. Therefore, there is more complete formation of the desirable equilibrium phases such as NaF, $CaF_2$, KF and LiF when fluorine containing gases are used. High metal shear forces result in efficient mixing of salt phases and separation thereof to the skim layer. Thus, the fluxing process of the present invention operates with enhanced kinetics and therefore minimizes the concentration of non-equilibrium salt phases produced during fluxing. The process results in efficient mixing and separation by the flotation method. Fluorine bearing gases in the process react to form a series of high melting point salts. These salts have the capability of effectively complexing or reacting with chlorine to increase the melting point of the resulting salt mixture which can be more easily separated as a solid.

Figure 2:
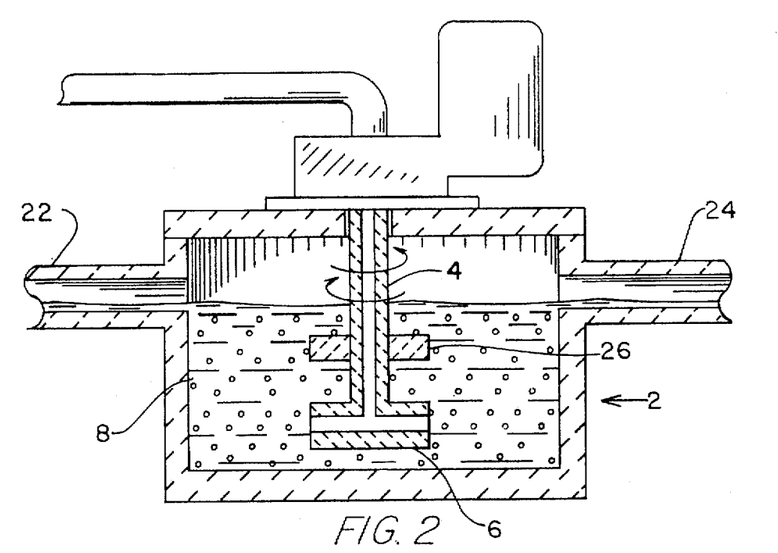
FIG. 2 is an elevational view in cross-section illustrating the invention using a double impeller.

FIG. 2 illustrates another embodiment wherein a second impeller 26 is fixed to a single impeller shaft 4. Impeller 6, fixed to the free end of shaft 4, can have a gas diffuser or nozzle or the gas can be supplied adjacent impeller 6 at a remote site in vessel 2 preferably below impeller 6. Additionally, impeller 26 may have a gas diffuser and can have the same configuration as impeller 6 or a different configuration which will aid in creating increased shear forces in molten metal when rotated in conjunction with impeller 6. Impeller 26 has the advantage of providing additional shear forces in the molten metal body when the rotation of the impeller is reversed. Thus, fluxing material is dispersed throughout the molten body with a higher level of intensity for a more efficient fluxing process. The times used for reversing can be similar to that used for the single impeller.

Figure 3:
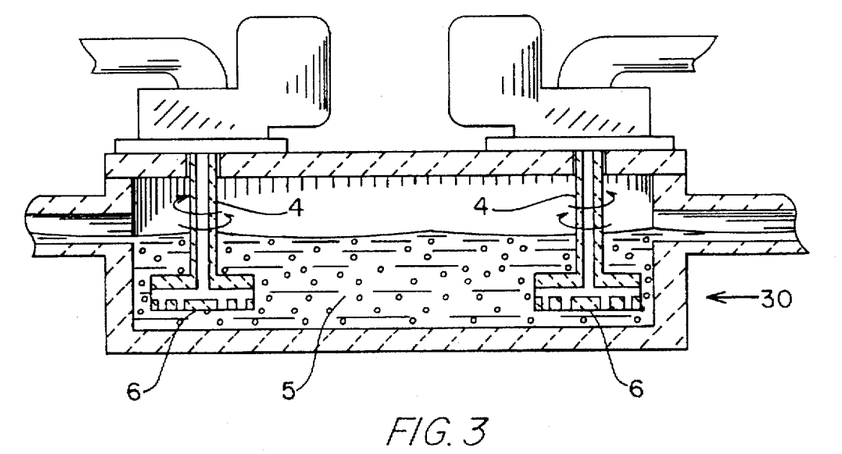
FIG. 3 is another cross-sectional view of twin impellers operating in accordance with the invention.

With reference to FIG. 3, there is shown another embodiment of the present invention including a containment vessel 30 having shafts 4 and impellers 6 containing molten aluminum 5. Shafts 4 and impellers 6 can be set to rotate in the same direction or opposite direction during the same time period. Thereafter, the rotation of each impeller is reversed periodically, usually in synchronization with the other impeller to provide for a high level of shear forces for dispersing of the media in the molten metal. Fluxing gas can be added in the same manner as referred to for the single impeller in FIG. 1. In this embodiment, the reversing cycle or period can be the same for each impeller or the reversing cycle can be shorter for one impeller and longer for the other and then these reversing cycles can be reversed in synchronization to obtain the most desirable combination of shear forces for dispersion. While two motors are shown driving the impellers in FIG. 3, one motor can be employed with the appropriate gears. The time periods for reversing direction of rotation can be similar to that described for FIG. 1.

Figure 4:
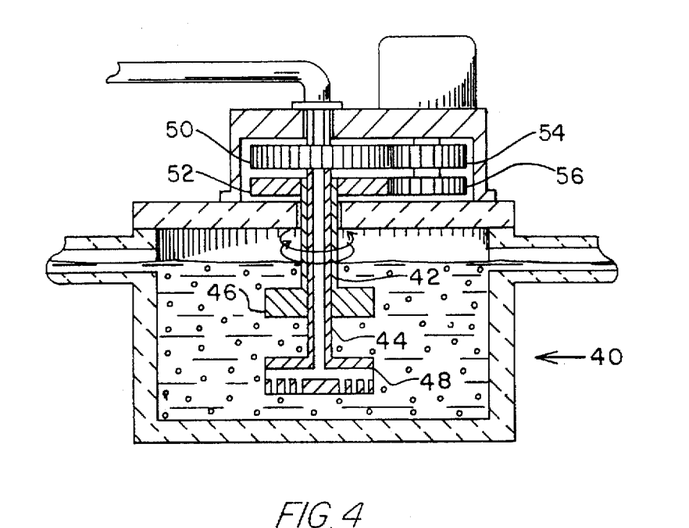
FIG. 4 shows a cross-sectional view of a further embodiment of the invention.

With respect to FIG. 4, there is shown a further embodiment of the present invention which includes a molten metal containment vessel 40 having two impellers on concentric shafts 42 and 44 which carry impellers 46 and 48. Fluxing gas may be supplied for fluxing purposes in the same way as referred to for FIG. 1. Additionally, for improved fluxing, the impellers 46 and 48 may rotate in the same direction for the same period of time. Further, impellers 46 and 48 may reverse direction at the same time for the same period. Or, impellers 46 and 48 may rotate in opposite directions for the same period, and both may reverse direction for the same period of time. Further, the rate of rotation for each impeller may be the same or one impeller may be set so as to rotate faster than the other in order to maximize shear force or the fluid velocity gradients in the molten metal. In the embodiment shown in FIG. 4, a single motor, which can be electric or air driven, is shown driving shafts 42 and 44 in the same direction of rotation through gears 50, 52, 54 and 56. In addition, the period or reversing cycle may be longer for one impeller than for the other impeller. Thus, it will be seen that various combinations of rates of rotation, direction of rotation, and periods of rotation may be utilized, all of which are intended to be encompassed within the scope of the invention because the specific details set forth are by way of illustration and not of limitation.

Figure 5:
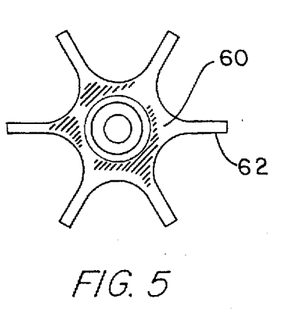
FIG. 5 is a top view of an impeller useful in the invention.
Figure 6:
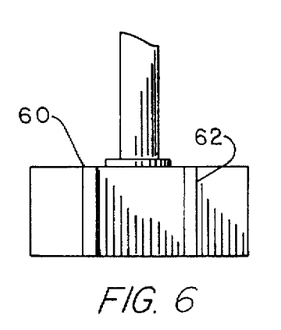
FIG. 6 is an elevational view of an impeller useful in the invention.
Figure 7:
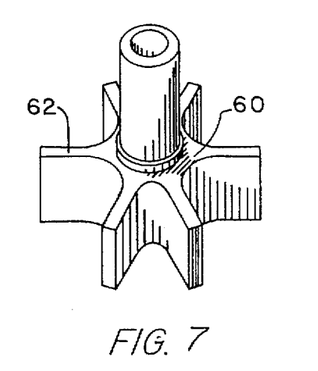
FIG. 7 is a perspective view of the impeller useful in the invention.

The impeller or disperser used in the present invention is any impeller or disperser which may be useful in creating shear forces in the melt for homogenization of the melt or for dispersing materials throughout the melt in accordance with the invention. Thus, the impeller may have canted vanes, and combinations of vanes may be used when two or more impellers are used. A suitable impeller 60, shown in FIGS. 5, 6 and 7, has vanes 62 substantially vertical to the plane of rotation. Such impeller is disclosed in U.S. Pat. No. 5,160,693 incorporated herein by reference.

The shaft and impeller may be made from graphite, silicon carbide or ceramic or such material which is compatible with molten metal such as molten aluminum.

The impellers of the present invention can rotate at an rpm in the range of 15 to 450 or combinations of such revolutions. The rate of rotation need not be constant. For example, the rate of rotation can be less at the beginning of the reversing period and can be higher at the end of the reversing period for purposes of inducing more constant shear stresses in to the melt.

Figure 8:
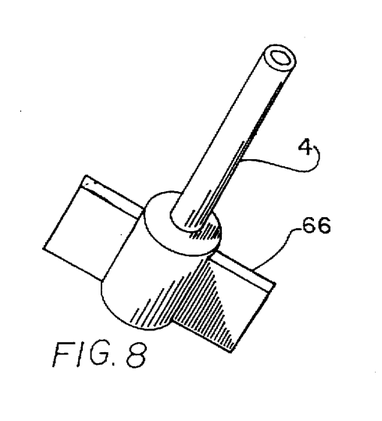
FIGS. 8 and 9 are embodiments illustrating impellers or paddles which may be used in accordance with the invention.
Figure 9:
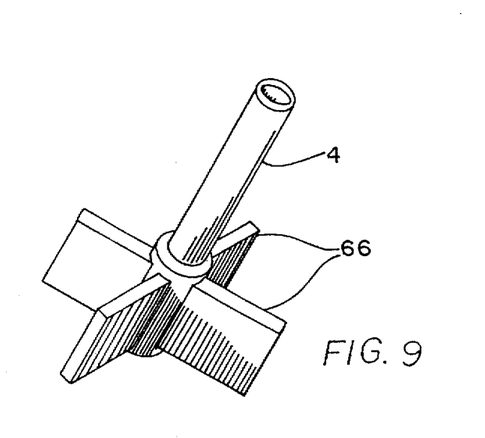

In addition, the impeller can have a flat paddle configuration as shown in FIG. 8 where shaft 4 terminates in flat plate 66. Fluxing gas may be added either remotely or through shaft 4 as disclosed earlier. Further, several flat plates 66 may be disposed along shaft 4 or shaft 4 may constitute a continuous plate at least to the extent that it is emerged in the melt. Plates 66 may be arranged as shown in FIG. 9, example, or any combination of plates may be used and such are intended to be encompassed within the scope of the invention. The plates or paddles generate very high shear forces in the melt in accordance with the invention and accordingly are very useful in the invention.

Figure 12:
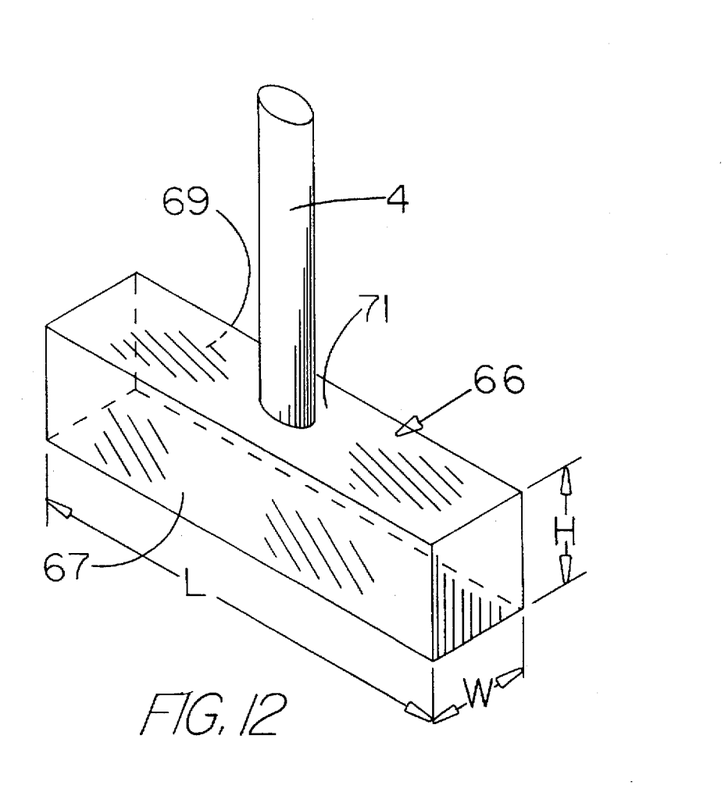
FIG. 12 is a perspective view of a block impeller particularly useful for bi-directional rotation in accordance with the invention.

In a preferred embodiment, the paddle or plate-shaped impeller may have the configuration set forth in FIG. 12 wherein the impeller 66 has a rectangular-shaped body having a first face 67 having a rectangular shape and having a second face 69 (shown in outline form) having a rectangular face. The shaft for impeller 66 is mounted on or through a top surface 71. Rectangular faces 67 and 69 have a length L and a height H, and further faces 67 and 69 are disposed substantially opposite each other. In addition, impeller 66 has a width W. It is preferred that faces 67 and 69 are substantially parallel to shaft 4. Further, it is preferred that faces 67 and 69 have a length L equal to or greater than height H. Length L to height H ratios are preferred to be maintained in a range of 1.6:1 to 12:1 and typically 2:1 to 6:1. Height H to width W ratios are preferred to be maintained in a range of about 6:1 to 1:1 and typically 4:1 to 1:1.

The impeller shown in FIG. 12 can be advantageously fabricated from carbon, graphite, silicon carbide, aluminum titinate, fused silica, alumina, mullite, magnesia, silicon nitrite and silicon oxynitride. Such materials can be machine, cast or pressed to the shape and dimension desired.

The paddle-shaped or rectangular-shaped impellers as shown in FIG. 8 and 12 are particularly suitable for bi-directional rotation because they provide for control of radical fluid velocity and substantially eliminate vorticity. The bi-directional rotation of this invention permits the use of aggressive impeller designs with high aspect ratios such as the paddle shapes or rectangular face-shaped impellers. The bi-directional rotation of the invention permits control of radical fluid velocity gradients as an intrinsic component of the process of fluxing or dispersing of gas, immiscible phases, e.g., molten salts, or solid particles rather than from a specific impeller configuration. The impellers shown in FIGS. 8 and 12, for example, can generate exceptionally high shear forces and are of a simple robust design. In addition, the configurations in FIGS. 8 and 12 are relatively easy to fabricate using ceramic materials. Impeller 66 can be attached to shaft 4 by a central hub using a pin and tapered connection or a pin and threaded connection.

Figure 10:
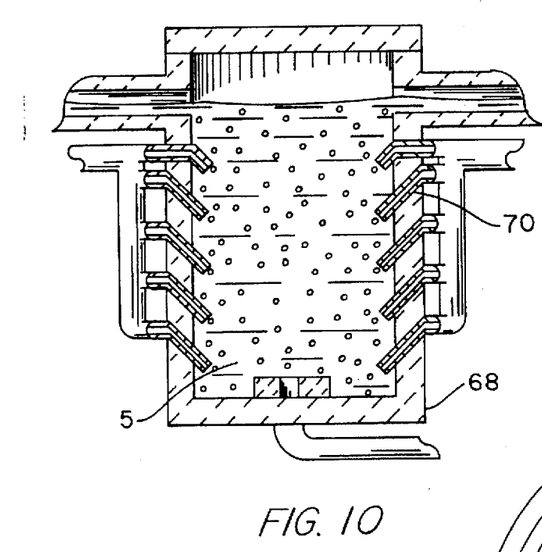
FIG. 10 is a cross section of a molten metal vessel employing tuyeres in the invention.
Figure 11:
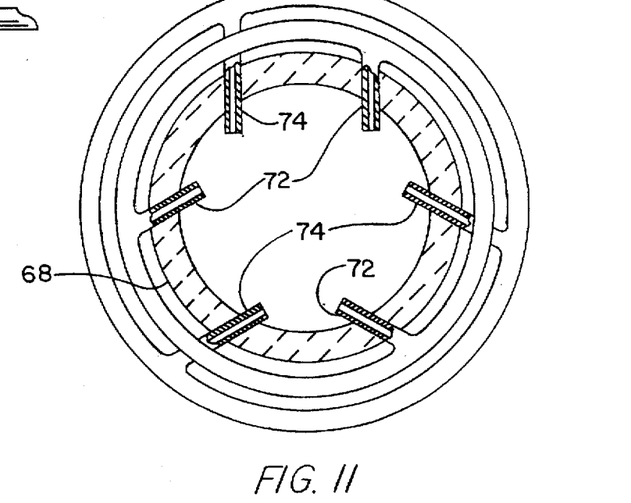
FIG. 11 is a cross section of the vessel of FIG. 10.

While generation of shear forces in melts such as molten metal having been demonstrated herein using impellers other mixing means or means for generating shear forces are contemplated. For example, shear forces may be generated by means of tuyeres 70, FIG. 10, in container 68 containing molten metal 5. In the configuration in FIG. 10, tuyeres 70 can be spaced apart up the side of container 68. One set of tuyeres 72 are arranged so as to direct gas or liquid such as molten salts therefrom in a clockwise direction and another set of tuyeres 74 can be positioned to direct gas or liquid therefrom in a counter current direction. One set of tuyeres are directed so as to move the melt in one direction and thereafter the second set of tuyeres are operated against the direction of the melt to generate shear forces therein to improve dispersion of fluxing material in the melt by reversing direction of melt flow.

In another embodiment the melt may be stirred in one direction by an electromagnet stirrer preferably in a circular direction. Afterwards, the electromagnet stirrer can be reversed periodically by reversing the electromagnetic field to generate shear forces in the melt and to promote intimate mixing or dispersing of media in the melt.

To facilitate fluxing efficiently, means is provided to interrupt gas flow to the body of molten metal at the time of rotation direction change of the impeller. This may be accomplished by use of a solenoid. An electric motor may be used to drive the impeller gearbox. If a DC motor (direct current) is employed, the direction of rotation can be accomplished by reversing the direction of the applied current. Current reversal is facilitated by a set of timers to control the duration of rotation in either direction. This may be coupled to a double throw relay. An important element of the current reversing circuit is a means for ramping the applied current at a rate that does not mechanically shock the system immediately upon reversal. Also required is a mechanical device capable of bi-directional rotation that attaches the impeller to the drive shaft and the drive shaft to a gearbox. The preferred method of operating and reversing direction of rotation is set forth in U.S. Pat. No. 5,462,580 incorporated herein by reference.

The process in accordance with the invention has the advantage that it requires less processing time. Thus, there is considerable savings in the energy requirement to maintain the body of molten metal at temperature to perform the fluxing operation. Further, the process and system has the advantage that the equipment used for performing the fluxing can be downsized resulting in further savings. Because the subject system is more efficient in dispersing gas, considerably less gas is needed for the fluxing operation. In addition, because the present system is essentially vortex free when compared to conventional systems, less skim is generated and further only minimal skim is ingested into the melt. Thus, a protective layer of skim or salt or other material can be maintained on the surface of the body with substantially no ingestion. The system is generally more efficient in removing both dissolved and suspended impurities.

While mixing in accordance with the invention has been described with respect to fluxing bodies of molten metal, its use is not necessarily limited to fluxing. That is, the present invention has application to any body containing molten material or a molten phase which is to be mixed with another phase such as another liquid or a solid phase, e.g., dispersing molten or solid salts in molten aluminum. Thus, the invention may be used for mixing a fluid body comprised of two or more phases. For example, the invention may be used for dispersing solid particles in molten metal such as silicon carbide particles in molten aluminum, e.g., mixing metals and non-metals. Further, the invention may be used for mixing two-phase aluminum systems such as molten aluminum and solid aluminum systems, for example, when molten aluminum is used to dissolve solid aluminum scrap. By media as used herein is meant to include gas, molten salts or solid salts and metals.

It should be understood that the shear forces and dispersion of media in the molten metal can be accomplished by a phase contactor or agitator provided in the body of molten metal. By disperser as used herein is meant to include any kind of phase contactor or agitator, including a propeller, impeller, nozzles, rotating plates, counterflow of molten metal and the like. Also, it will be understood that the shear forces and dispersion may be created by a rotating molten metal container or insert whose direction of rotation is reversed periodically in accordance with the teachings of this invention. Further, the shear forces and dispersion of media or mixing may be accomplished by rotating a molten metal container in one direction and rotating the phase contactor, e.g., impeller, in the opposite direction. The molten metal container may be mounted on a turntable for uni-directional rotation while the impeller is mounted to rotate uni-directionally opposite to the molten metal container.

Figure 13:
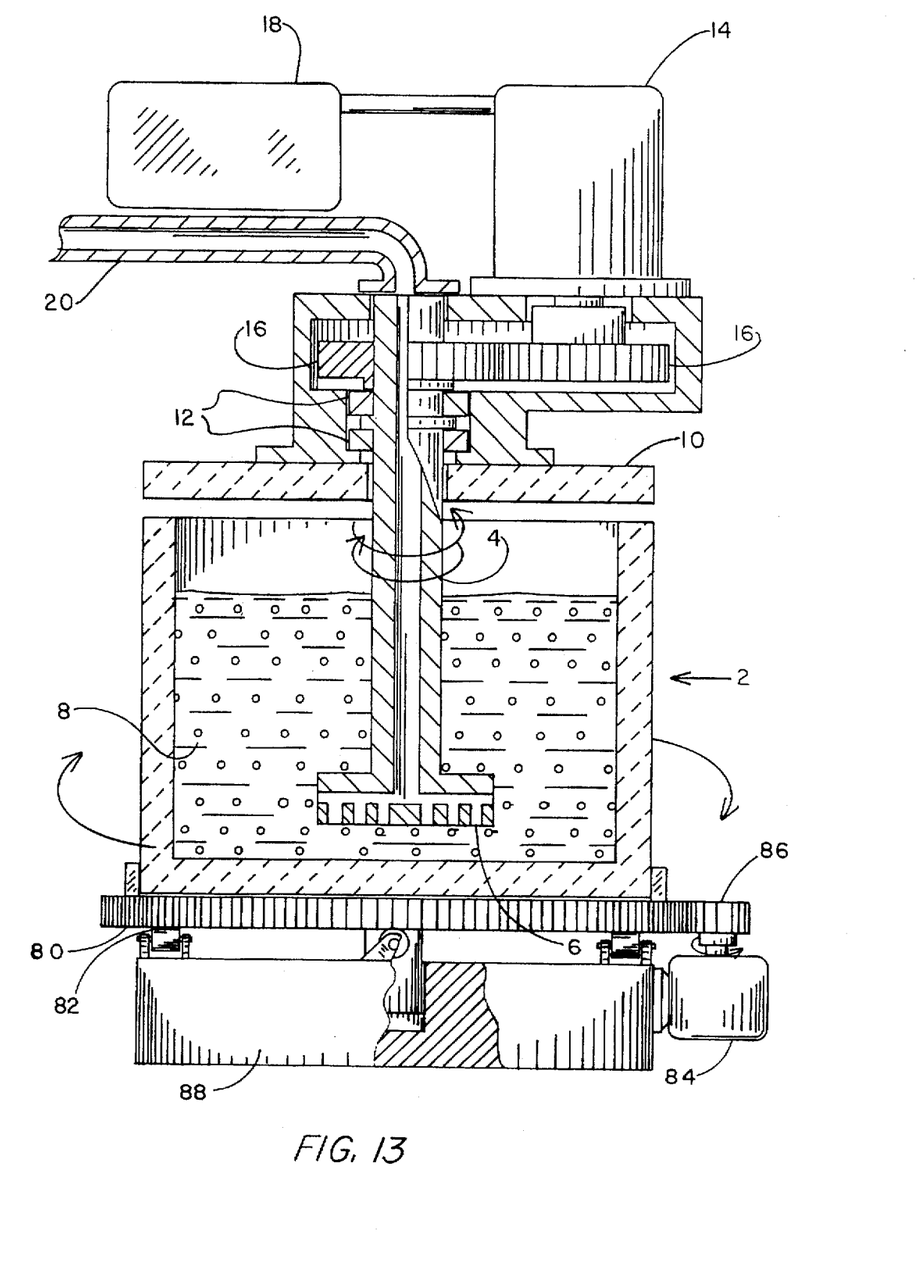
FIG. 13 is a cross section showing a rotatable ladle and uni-directional impeller combination for treating molten metal.

Referring now to FIG. 13, there is shown a schematic of a container 2 having molten metal 8, the container resting on turntable 80. Turntable 80 is supported on rollers 82 and rotated by motor 84 and gear 86. Only two rollers 82 are shown, but additional rollers can be added as required. Rollers 82 are shown mounted in cement block 88. The turntable should be capable of turning container 2 at a rate of from about 6 to 375 rpm, preferably 15 to 200 rpm. In FIG. 13, container 2 is shown turning in a clockwise direction.

Positioned over container 2 is an impeller assembly substantially as described with respect to FIG. 1 except shaft 4 and disperser 6 are rotated uni-directionally in a direction opposite to the rotation of container 2. For example, container 2 is shown rotating clockwise and impeller 4 is shown rotating counter clockwise. During treatment for fluxing, for example, fluxing gas can be added through tube 20 and down hollow shaft 4 before being dispersed into the molten metal through impeller 6.

The impeller can be rotated at a rate of 45 to 1150 rpm, preferably 110 to 650 rpm, depending to some extent on the rate of rotation of the container. Preferably, the rate of rotation of the impeller is balanced with the rate of rotation of the container to maximize the shear forces induced by the counter-rotating impeller. Further, preferably, the rates of rotation should be matched to minimize vortexing.

Any impeller can be used which provides high shear forces in a counter-rotating body of molten metals such as molten aluminum. Some of the impellers useful in the invention are depicted herein. In addition, while one impeller has been shown in FIG. 13, multiple impellers, e.g., two or more, can be provided on a common shaft to induce shear forces to the molten metal. Further, the rate of rotation of the impellers can be adjusted to provide high shear forces in the counter-rotating body.

The counter-rotating impeller and container is particularly suitable for ladles of molten metal as molten metal is being transferred to a casting facility.

EXAMPLE

For purposes of demonstrating the effectiveness of reverse rotation for purposes of fluxing molten aluminum on a continuous basis, a chamber containing molten aluminum was used and an impeller having an 8 inch diameter was immersed in the molten aluminum to a depth of 25 inches. The chamber had a circular cross-section. The impeller was rotated at a speed of 425 RPM and the direction of rotation was reversed every 24 seconds. Molten aluminum was flowed through the chamber at a rate of 61,000 lbs/hour and the metal residence time in the chamber was 97 seconds. For purposes of hydrogen removal, argon gas was introduced through the impeller at a rate of 150 SCF/hour. Hydrogen concentration is given in $cm^3H_2(STP)/100$ g Al and determined by Ransley solid extraction method. Aluminum alloys AA6111 and AA3004 were tested.

TABLE I

| Alloy Sample | Upstream $H_2$ Concentration | Downstream $H_2$ Concentration | % Reduction |
| --- | --- | --- | --- |
| 6111-1 | 0.23 | 0.09 | 61% |
| 6111-2 | 0.24 | 0.09 | 63% |
| 6111-3 | 0.26 | 0.09 | 65% |
| 3004-1 | 0.17 | 0.06 | 65% |
| 3004-2 | 0.19 | 0.04 | 79% |
| 3004-3 | 0.18 | 0.06 | 67% |

For purposes of testing alkali removal from AA5052 a fluxing gas of argon and chlorine was used where argon was flowed to the melt at a rate of 150 SCF/hour and chlorine, at 7.5 SCF/hour. The other conditions were as noted above. Trace element concentration in wt. % was determined by optical emissions spectroscopy. The results were as follows:

TABLE II

| Element | Upstream Concentration | Downstream Concentration | Stoichiometric Chlorine required |
| --- | --- | --- | --- |
| Sodium | 0.0008 w/o | 0.0002 w/o | 2.9 scfh |
| Calcium | 0.0012 w/o | 0.0007 w/o | 2.8 scfh |
| Lithium | 0.0003 w/o | 0.0002 w/o | 1.6 scfh |
| Total Stoichiometric Chlorine Requirement | | | 7.3 scfh |
| Actual Chlorine Used | | | 7.5 scfh |
| Overall Percent Stoichiometric Reduction | | | 97% |

It will be noted that $H_2$ was reduced by over 60% in all tests and that the overall percent stoichiometric reduction of Na, Ca and Li was 97%.

While the invention has been described in terms of preferred embodiments, the claims appended hereto are intended to encompass other embodiments which fall within the spirit of the invention.

What is claimed is:

1. An improved method for processing a body of molten metal using an impeller and a rotatable container, the method including increasing shear forces in the body of molten metal and reducing vortex formation, the method comprising the steps of:

(a) providing a body of molten metal in a container; and
    (b) projecting an impeller on a shaft into said body and
        (i) rotating said impeller in one direction; and
        (ii) rotating said container and said body of molten metal in a direction opposite of rotating said impeller, the container and the impeller being rotated at a rate which minimizes vortex formation and which maximizes shear forces in said body for purposes of improved processing.

2. The method in accordance with claim 1 wherein said molten metal is molten aluminum.

3. The method in accordance with claim 1 including introducing fluxing gas through said shaft projecting into said body.

4. The method in accordance with claim 1 including mounting at least two impellers on said shaft and located in said body of molten metal.

5. The method in accordance with claim 2 including introducing a fluxing gas selected from the group consisting of nitrogen-containing, carbon-containing and halogen-containing gases.

6. The method in accordance with claim 5 wherein said gas is a chlorinaceous gas.

7. The method in accordance with claim 5 wherein said fluxing gas comprises a combination of chlorine and sulfahexafluoride.

8. The method in accordance with claim 1 including rotating said container at a rate in the range of 6 to 375 rpm.

9. The method in accordance with claim 1 including rotating said impeller at a rate in the range of 45 to 1150 rpm.

10. The method in accordance with claim 1 including rotating said container at a rate in the range of 15 to 200 rpm and rotating said impeller at a rate in the range of 110 to 650 rpm.

11. An improved method for processing a body of molten aluminum using an impeller and a rotatable container, the method including increasing shear forces in the body of molten aluminum and reducing vortex formation, the method comprising the steps of:

(a) providing a body of molten aluminum in a container; and
    (b) projecting an impeller on a shaft into said body and
        (i) rotating said impeller in one direction at a rate in the range of 45 to 1150 rpm;
        (ii) introducing fluxing gas to said molten aluminum through said shaft during said rotating of said impeller; and
        (iii) rotating said container and said body of molten aluminum in a direction opposite of rotating said impeller, the container and the impeller being rotated at a rate which minimizes vortex formation and which maximizes shear forces in said body for purposes of improved processing.

12. The method in accordance with claim 11 including introducing a fluxing gas selected from the group consisting of nitrogen-containing, carbon-containing and halogen-containing gases.

13. The method in accordance with claim 11 wherein said gas is a chlorinaceous gas.

14. The method in accordance with claim 11 wherein said fluxing gas comprises a combination of chlorine and sulfahexafluoride.

15. The method in accordance with claim 11 including mounting at least two impellers on said shaft and located in said body of molten metal.

* * * * *